(12) United States Patent
Pydin

(10) Patent No.: US 12,282,329 B2
(45) Date of Patent: Apr. 22, 2025

(54) ROUTE DETERMINATION SYSTEM, MOBILE OBJECT, AND RECORDING MEDIUM

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 301 days.

(21) Appl. No.: 17/848,626

(22) Filed: Jun. 24, 2022

(65) Prior Publication Data
US 2022/0413506 A1 Dec. 29, 2022

(30) Foreign Application Priority Data
Jun. 29, 2021 (JP) ................. 2021-107376

(51) Int. Cl.
*G05D 1/00* (2024.01)
*G06Q 10/047* (2023.01)
*G06Q 10/0832* (2023.01)

(52) U.S. Cl.
CPC ......... *G05D 1/0217* (2013.01); *G05D 1/0274* (2013.01); *G06Q 10/047* (2013.01); *G06Q 10/0832* (2013.01)

(58) Field of Classification Search
CPC .. G05D 1/0217; G05D 1/0274; G06Q 10/047; G06Q 10/0832
See application file for complete search history.

(56) References Cited

U.S. PATENT DOCUMENTS

2020/0073396 A1* 3/2020 Shimizu ............... G05D 1/0219
2020/0166945 A1* 5/2020 Kim ...................... B60W 50/00

FOREIGN PATENT DOCUMENTS

CN 109625822 B * 10/2024 ............. B65G 35/00
JP 2019-135579 8/2019

* cited by examiner

*Primary Examiner* — Andrew R Dyer
*Assistant Examiner* — Chase L Cooley
(74) *Attorney, Agent, or Firm* — Rankin, Hill & Clark LLP

(57) ABSTRACT

A route determination system includes: an initial route line setting section that sets an initial route line including a plurality of split points between a starting point and a destination and connecting the first and second waypoints; and a movement route determination section that generates a candidate route line starting from the first waypoint and reaching the second waypoint by setting a predetermined number of control points at arbitrary positions within a specific range on the map, and that when all split points of the candidate route line are positioned within the passable area, determines, as a movement route for a mobile object, a route in a real space corresponding to the candidate route line, and when at least one of the split points of the candidate route line is positioned within an impassable area, increases the number of control points and performs the curving processing again.

8 Claims, 10 Drawing Sheets

ROUTE DETERMINATION SYSTEM, MOBILE OBJECT, AND RECORDING MEDIUM

INCORPORATION BY REFERENCE

The present application claims priority under 35 U.S.C. § 119 to Japanese Patent Application No. 2021-107376 filed on Jun. 29, 2021. The content of the application is incorporated herein by reference in its entirety.

BACKGROUND OF THE INVENTION

Field of the Invention

The present invention relates to a route determination system, a mobile object, and a recording medium.

Description of the Related Art

Conventionally, a mobile body control system has been proposed that generates, by a Bezier curve method, a smooth virtual line guiding an electric wheelchair along a predetermined travel route within a travelable area extracted based on an image captured by a camera mounted on the electric wheelchair (for example, Japanese Patent Laid-Open No. 2019-135579).

For example, for a mobile object capable of making a spin turn, such as a two-wheel differential-drive robot, a route from a starting point up to a destination is determined by connecting the starting point, a waypoint, and the destination by a straight line. However, for a mobile object incapable of making a spin turn, it is necessary to draw a smooth curve at a place where a traveling direction is changed. In such a case, for example, a Bezier curve is used for a method of generating the curve. However, there is a disadvantage that when a route is complicated, processing for determining the route becomes complicated because many control points need to be set to generate a curve, and it is therefore difficult to quickly determine the route.

The present invention has been made in view of such a background, and an object of the present invention is to provide a route determination system, a mobile object, and a route determination program that can reduce time required to determine a route for a mobile object.

SUMMARY OF THE INVENTION

As a first aspect to achieve the above-described object, a route determination system is provided that includes: a movement area recognition section that recognizes a passable area and an impassable area on a map of a predetermined area including a starting point where a mobile object starts moving and a destination where the mobile object finishes moving, the passable area being an area in which the mobile object is allowed to move, the impassable area being an area in which the mobile object is not allowed to move; an initial route line setting section that sets an initial route line including a plurality of split points by connecting the starting point and the destination on the map; and a movement route determination section that generates a candidate route line starting from the starting point and reaching the destination by setting a predetermined number of control points at arbitrary positions within a specific range on the map and performing curving processing of curving the initial route line based on the control points, and that when all of the split points of the candidate route line are positioned within the passable area, determines, as a movement route for the mobile object, a route in a real space corresponding to the candidate route line, and when at least one of the split points of the candidate route line is positioned within the impassable area, increases the number of the control points and performs the curving processing again.

In the route determination system, the movement route determination section may be configured to increase the number of the control points and performs the curving processing again when the candidate route line with all of the split points positioned within the passable area is not obtained even if the predetermined number of the control points are set at arbitrary positions within the specific range and then the curving processing is performed a predetermined number of times.

In the route determination system, the movement route determination section may be configured to set the specific range to a range including the starting point and the destination.

In the route determination system, the movement route determination section may be configured to enlarge the specific range when the candidate route line with all of the split points positioned within the passable area is not obtained even if the curving processing is performed after the number of the control points set at arbitrary positions within the specific range is increased to a predetermined upper-limit number.

In the route determination system, the initial route line setting section may be configured to change the number of the split points, according to a degree of complexity of a movement environment from the starting point up to the destination.

The route determination system may be configured to further include a total movement route determination section that: divides the initial route line into a plurality of sub-initial route lines, each having ends positioned within the passable area; determines a plurality of sub-movement routes corresponding to the plurality of sub-initial route lines, respectively, by, with respect to each of the plurality of sub-initial route lines, assuming that one of the ends of the sub-initial route line is the starting point and the other end of the sub-initial route line is the destination, and performing processing performed by the initial route line setting section and the movement route determination section; and determines a total movement route from the starting point up to the destination in the real space by joining the plurality of sub-movement routes in order of the plurality of sub-initial route lines.

As a second aspect to achieve the above-described object, a mobile object is provided that includes the route determination system.

As a third aspect to achieve the above-described object, a non-transitory recording medium is provided on which a route determination program is recorded, the route determination program causes a computer to function as: a movement area recognition section that recognizes a passable area and an impassable area on a map of a predetermined area including a starting point where a mobile object starts moving and a destination where the mobile object finishes moving, the passable area being an area in which the mobile object is allowed to move, the impassable area being an area in which the mobile object is not allowed to move; an initial route line setting section that sets an initial route line including a plurality of split points by connecting the starting point and the destination on the map; and a movement route determination section that generates a candidate route line starting from the starting point and reaching the destination by setting a predetermined number of control points at arbitrary positions within a specific range on the map and performing curving processing of curving the initial route line based on the control points, and that when all of the split points of the candidate route line are positioned within the passable area, determines, as a movement route for the mobile object, a route in a real space corresponding to the candidate route line, and when at least one of the split points of the candidate route line is positioned within the impassable area, increases the number of the control points and performs the curving processing again.

According to the route determination system as described above, the curving processing is performed by the movement route determination section, with the number of control points sequentially increased, until the candidate route line with all split points positioned within the passable area is obtained. Thus, execution of the complicated curving processing based on more control points than necessary is restrained, so that time required to determine a route for the mobile object can be reduced.

DETAILED DESCRIPTION OF THE PREFERRED EMBODIMENTS

1. Configuration of Route Determination System

Figure 1:
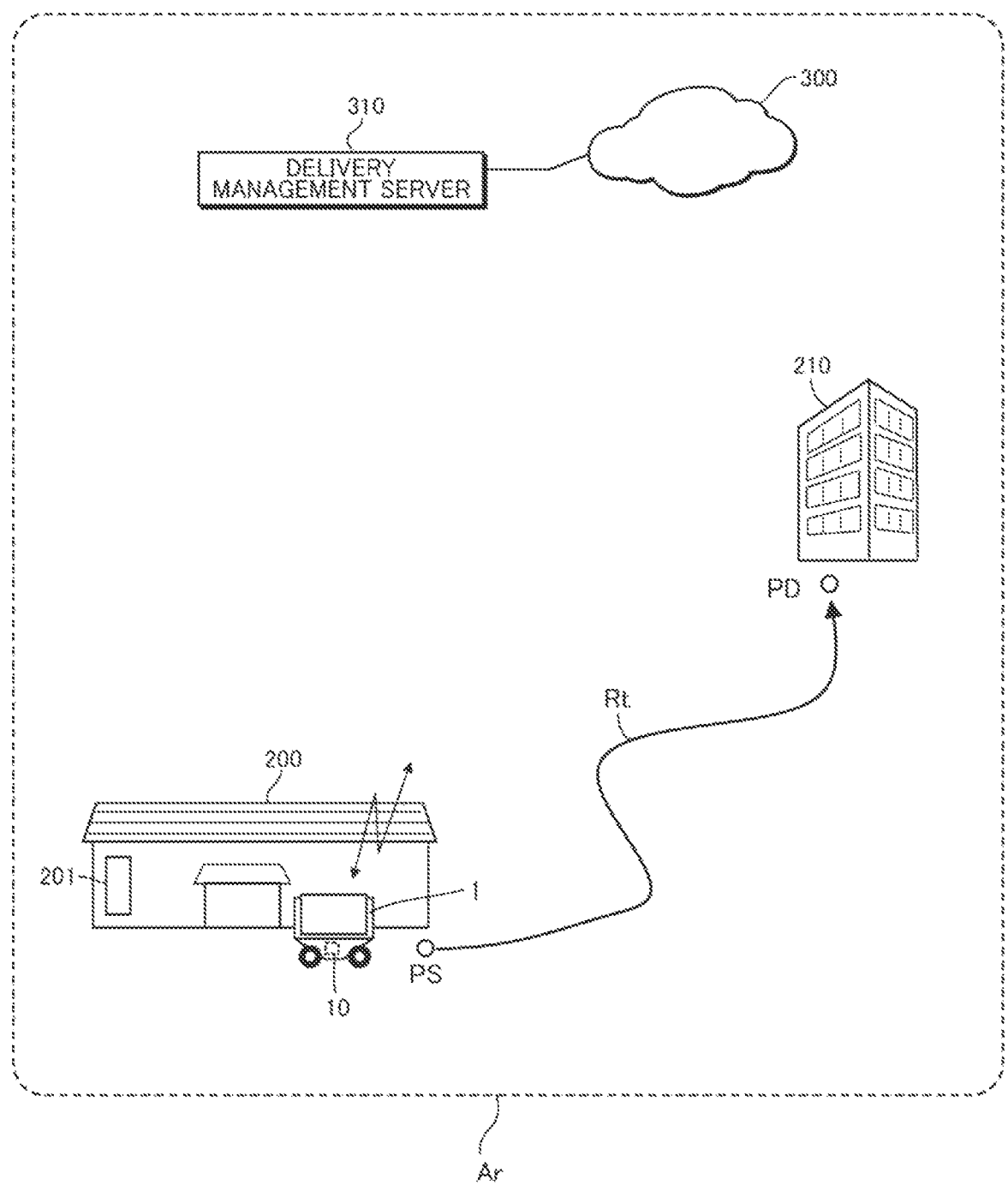
FIG. 1 is an explanatory diagram of an aspect of delivery by a delivery robot including a route determination system.

An aspect of delivery by a delivery robot 1 according to an embodiment is described with reference to FIG. 1. The delivery robot 1 corresponds to a mobile object of the present disclosure. The delivery robot 1 includes a controller 10 including functionality of a route determination system, and determines a movement route Rt from a starting point PS where a delivery is started, up to a destination PD where the delivery is finished, based on a map of a predetermined area Ar including the starting point PS and the destination PD. The starting point PS is, for example, a place where a delivery center 200 is located, and the destination PD is, for example, a place where a delivery-destination building 210 is located.

The delivery robot 1 performs communication with a delivery management server 310 through a communication network 300. Moreover, the delivery robot 1 performs communication, directly or through the communication network 300, with a management system 201 included in the delivery center 200. The delivery robot 1 receives delivery task information transmitted from the delivery management server 310 or the management system 201 of the delivery center 200.

The controller 10 recognizes positions of the starting point PS and the destination PD included in the delivery task information, and determines the movement route Rt from the starting point PS up to the destination PD within a passable area in which the delivery robot 1 is allowed to travel, based on the map of the predetermined area Ar. Then, the controller 10 performs control of causing the delivery robot 1 to autonomously travel along the determined movement route Rt, whereby the delivery from the starting point PS up to the destination PD is carried out.

2. Configuration of Delivery Robot

A configuration of the delivery robot 1 is described with reference to FIG. 2. The delivery robot 1 includes the controller 10 including the functionality of the route determination system, and includes a communication unit 50, a touch panel 51, a camera 52, a speaker 53, a microphone 54, a lidar 55, a GNSS (Global Navigation Satellite System) sensor 56, a resolver 57, an IMU (Inertial Measurement Unit) 58, and a traveling unit 60 that are connected to the controller 10.

The communication unit 50 performs communication with the delivery management server 310 and the management system 201 of the delivery center 200 shown in FIG. 1, and with an undepicted mobile terminal used by a delivery manager, and the like. The touch panel 51 outputs touch operation information indicating a status of a touch operation made by the delivery manager to the controller 10, and displays a screen corresponding to display control information inputted from the controller 10. The camera 52 captures an image of surroundings of the delivery robot 1 and outputs the captured image to the controller 10. The speaker 53 outputs an announcement sound or the like, according to a sound control signal inputted from the controller 10.

The microphone 54 detects sound around the delivery robot 1 and outputs sound detection information to the controller 10. The lidar 55 detects a position of an object existing around the delivery robot 1 and outputs object detection information to the controller 10. The GNSS sensor 56 detects a current position of the delivery robot 1 by receiving radio waves from a GNSS satellite and outputs current position information indicating the current position to the controller 10. The resolver 57 senses the number of revolutions of an electric motor included in the traveling unit 60 and outputs rotation speed sensing information to the controller 10. The controller 10 calculates an odometry and a wheel rotation speed of the delivery robot 1, based on the number of revolutions sensed by the resolver 57.

The IMU 58 detects a three-axis angular velocity and an acceleration rate and outputs detection information to the controller 10. The controller 10 calculates an attitude (roll, pitch, yaw) of the delivery robot 1, based on the three-axis angular velocity and the acceleration rate detected by the IMU 58. The traveling unit 60 is a drive unit including an electric motor, drive wheels driven by the electric motor, a battery supplying electricity to the electric motor, a steering mechanism, and the like, which are not depicted. The traveling unit 60 controls operation of the electric motor, the steering mechanism, and the like, according to traveling control information inputted from the controller 10. Moreover, the traveling unit 60 outputs traveling operation information indicating a state of operation of the traveling unit 60 detected by an undepicted sensor or the like to the controller 10.

The controller 10 is a control unit including a processor 20 (corresponding to a computer of the present disclosure), a memory 30, an undepicted interface circuit, and the like. A route determination program 31, a delivery control program 32, and map data 33 are stored in the memory 30. The route determination program 31 and the delivery control program 32 may be read from a non-transitory recording medium 70 (magnetic disk, optical disk, flash memory, or the like) and stored in the memory 30, or may be downloaded from an external system such as the delivery management server 310 and stored in the memory 30.

The processor 20 functions as a movement area recognition section 21, a movement environment complexity degree recognition section 22, an initial route line setting section 23, a movement route determination section 24, and a total movement route determination section 25, by reading and executing the route determination program 31. Moreover, the processor 20 functions as a delivery control section 26 by reading and executing the delivery control program 32.

Figure 3:
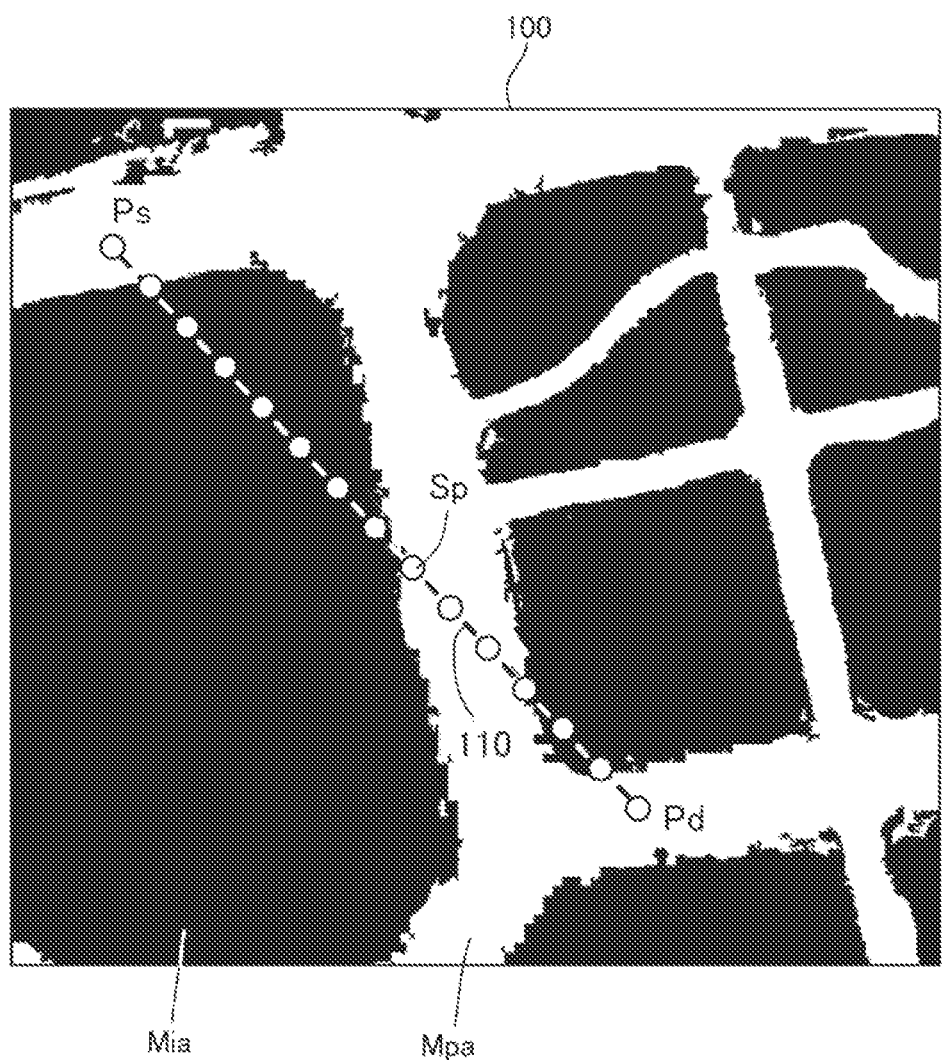
FIG. 3 is an explanatory diagram of an initial set line.

On the map of the predetermined area Ar shown in FIG. 1, the movement area recognition section 21 distinctively recognizes a passable area in which the delivery robot 1 is allowed to move (travel) and an impassable area in which the delivery robot 1 is not allowed to move, by referring to the map data 33. The map data 33 may be downloaded from an external system such as the delivery management server 310 and stored in the memory 30, or may be generated by performing image processing on an aerial photograph of the predetermined area Ar. FIG. 3 shows an example of the map 100 of the predetermined area Ar, in which the passable area Mpa is indicated in white, and the impassable area Mia is distinctively indicated in black. On the map 100, Ps is a position corresponding to the starting point PS in a real space, and Pd is a position corresponding to the destination PD in the real space. Hereinafter, "starting point Ps", "destination Pd" are used in a description of the map.

The movement environment complexity degree recognition section 22 recognizes a degree of complexity of a movement environment traveled by the delivery robot 1 from the starting point PS up to the destination PD. In the present embodiment, the more impassable areas there are in the map 100, the higher degree of complexity of the movement environment the movement environment complexity degree recognition section 22 recognizes. Note that the degree of complexity of the movement environment may be recognized based on another criterion for determination. For example, the degree of complexity of the movement environment may be recognized based on shapes of roads (largeness of the number of turns, narrowness of the widths of the roads, and the like) on the map.

The initial route line setting section 23 sets an initial route line 110 including a plurality of split points Sp by connecting the starting point Ps and the destination Pd on the map 100, as shown in FIG. 3. The movement route determination section 24 sets a control point Cp11 at an arbitrary position in a specific range on the map 100 (here, a whole range of the map 100) and converts the initial route line 110 into a Bezier curve 111 through a publicly known Bezier curve generation scheme, as shown in FIG. 4.

Figure 4:
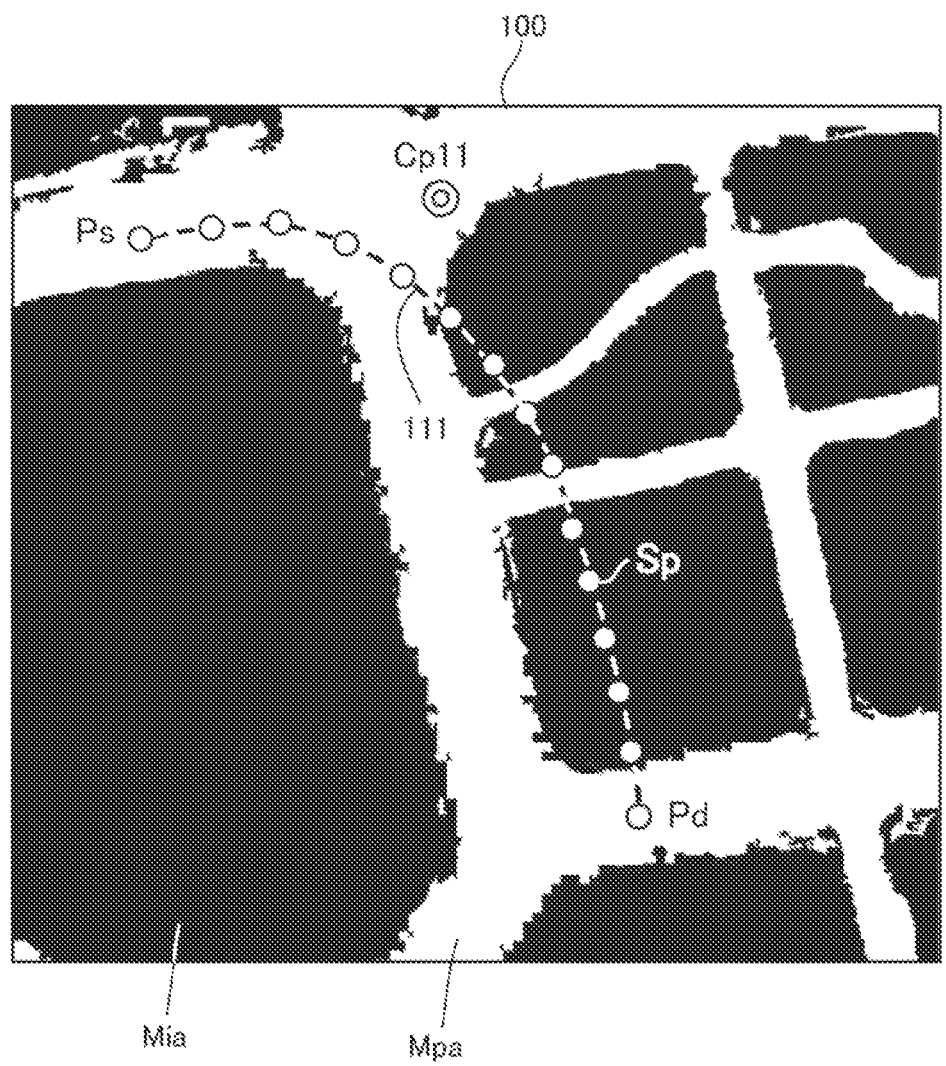
FIG. 4 is an explanatory diagram of an example of Bezier curve generation based on one control point.
Figure 5:
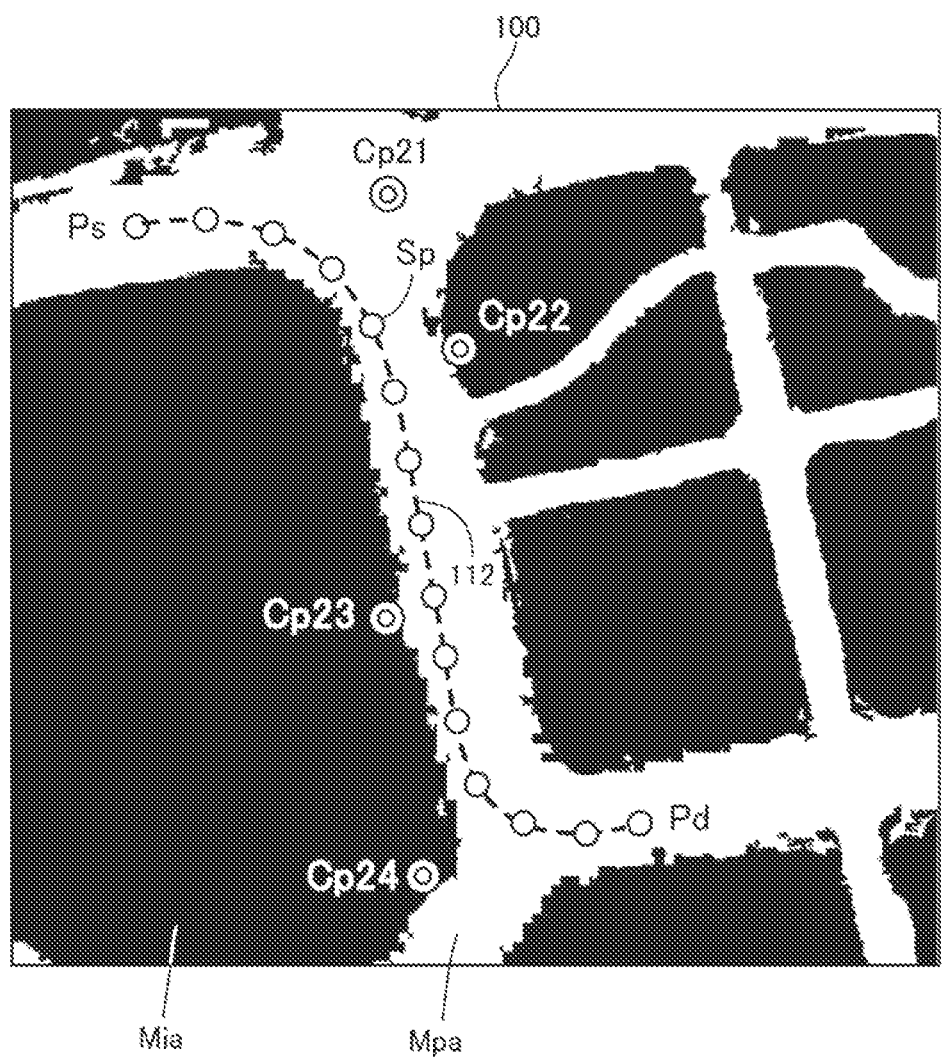
FIG. 5 is an explanatory diagram of an example of Bezier curve generation based on a plurality of control points.

When at least one of the split points Sp of the Bezier curve 111 is positioned within any impassable area Mia as shown in FIG. 4, the movement route determination section 24 increases the number of control points and performs again the processing of converting the initial route line 110 into a Bezier curve 112, as shown in FIG. 5. FIG. 5 shows an example of the conversion into the Bezier curve 112 based on four control points Cp21, Cp22, Cp23, Cp24. In FIG. 5, since the Bezier curve 112 with all split points Sp positioned within the passable area Mpa is obtained, the movement route determination section 24 determines a route in the real space corresponding to the Bezier curve 112, as the movement route Rt from the starting point PS up to the destination PD shown in FIG. 1. The movement route determination section 24 performs optimization processing of minimizing the length of the candidate route line with all split points positioned within the passable area, while maintaining a state in which all of the split points are positioned within the passable area, and thus determines the movement route Rt.

Figure 6:
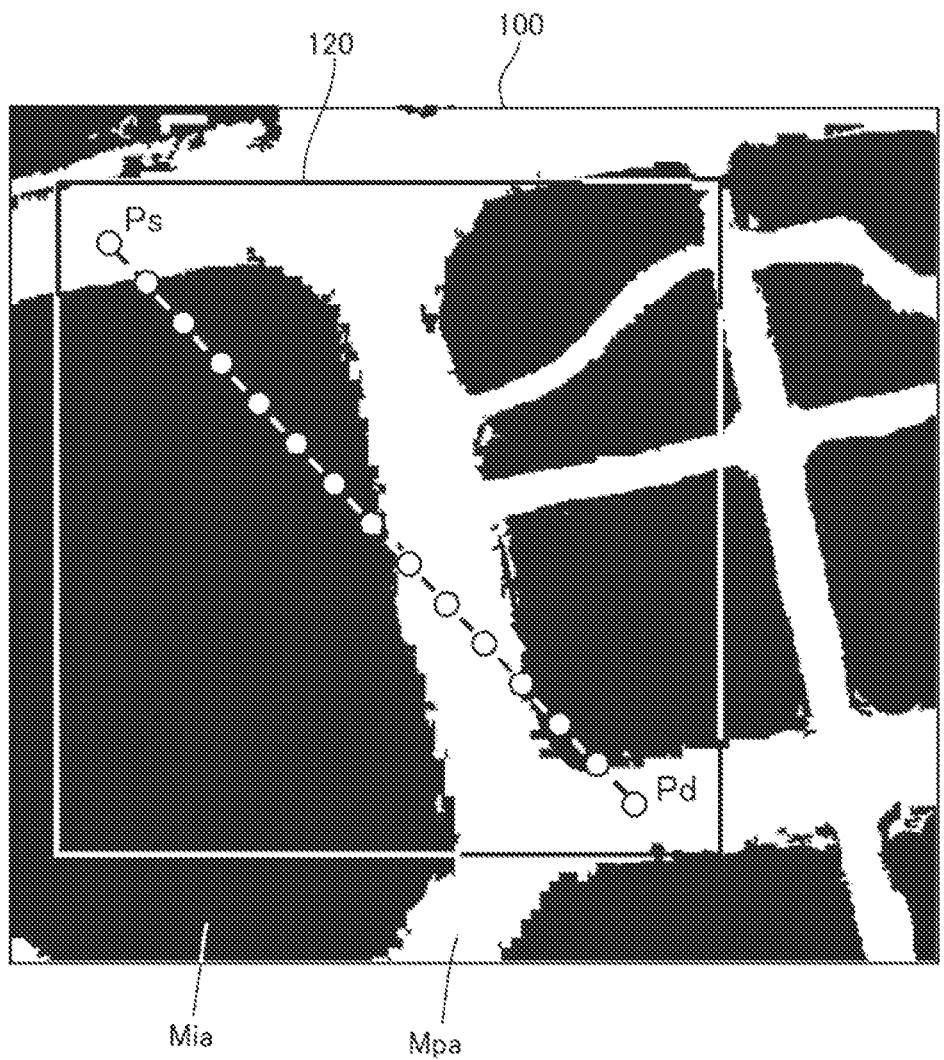
FIG. 6 is an explanatory diagram of a specific range in which a control point is set.

FIG. 6 shows an example in which the specific range, within which the movement route determination section 24 sets control points, is set not to the entire map 100 but to a range 120 including the starting point Ps and the destination Pd. Although the specific range 120 is a rectangular range in FIG. 6, the specific range 120 may be a range in another shape such as a circle. Moreover, the movement route determination section 24 may enlarge the specific range, depending on a state of generation of the candidate route line. For example, the movement route determination section 24 may enlarge the specific range when a candidate route line with all split points positioned within the passable area cannot be obtained even if the number of control points is increased to a predetermined upper-limit number.

The total movement route determination section 25 performs processing of dividing the initial route line into a plurality of sub-initial route lines and determining the movement route when the degree of complexity of the movement environment recognized by the movement environment complexity degree recognition section 22 exceeds a predetermined upper-limit level and it is therefore anticipated that it is difficult to convert the initial route line from the starting point Ps up to the destination Pd into a Bezier curve with all split points positioned within the passable area. Details of the processing will be described later.

The delivery control section 26 performs control of causing the delivery robot 1 to autonomously travel along the movement route Rt from the starting point PS up to the destination PD determined by the movement route determination section 24 or the total movement route determination section 25. Specifically, the delivery control section 26 controls operation of the traveling unit 60 such that the delivery robot 1 travels along the movement route Rt, based on the current position of the delivery robot 1 detected by the GNSS sensor 56 and on the map data 33. Moreover, the delivery control section 26 performs control of avoiding contact of the delivery robot 1 with another object, based on the image captured by the camera 52 and the object detection information from the lidar 55.

3. Processing of Determining Route

Figure 7:
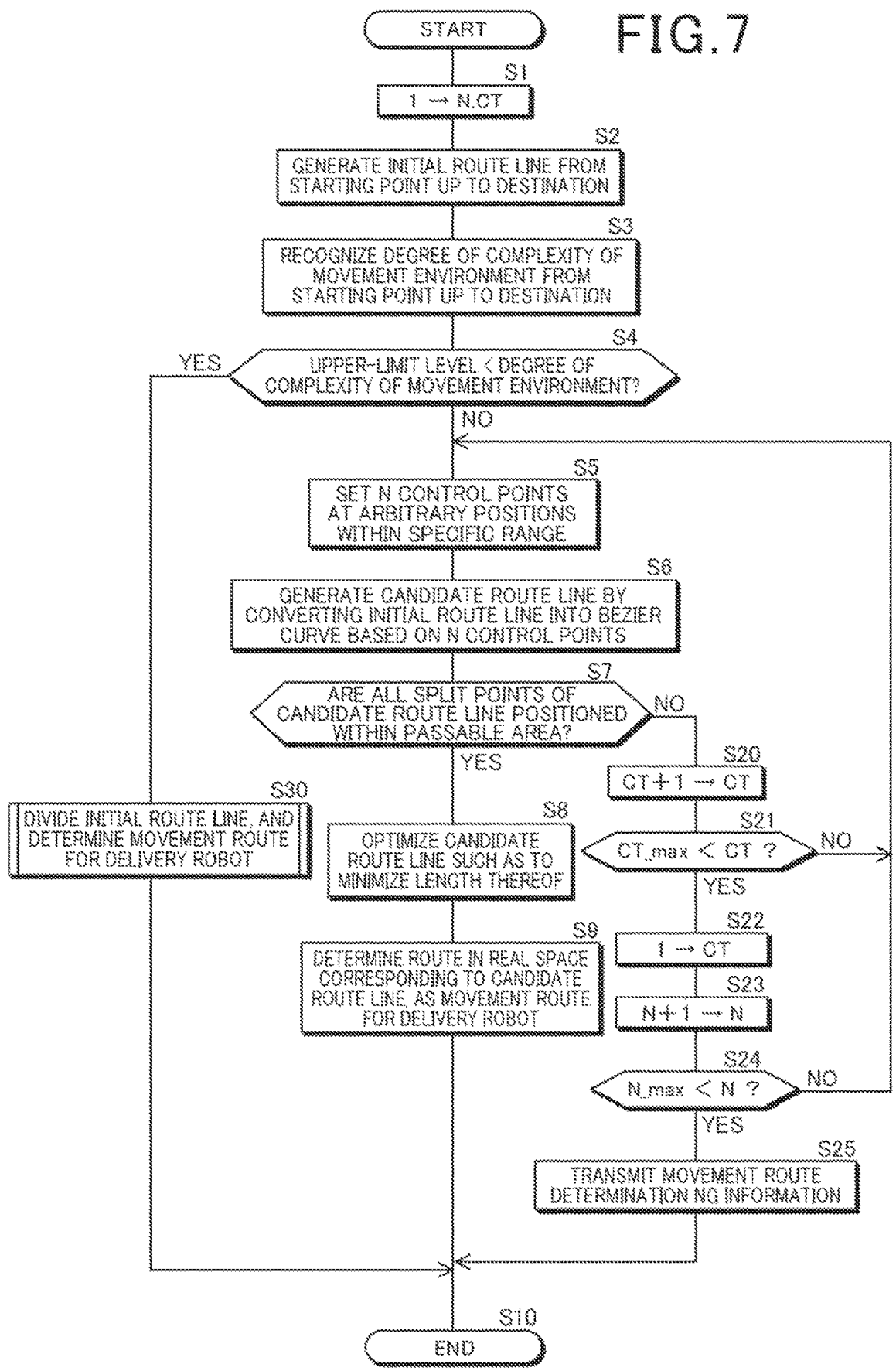
FIG. 7 is a flowchart of route determination processing.

Processing of determining a route performed by the functionality of the route determination system in the controller 10 is described by following a flowchart shown in FIG. 7. In step S1 in FIG. 7, the movement route determination section 24 sets each of variables N and CT to be used in loop processing, which will be described later, to an initial value of one. In next step S2, the initial route line setting section 23 sets an initial route line 110 including a plurality of split points Sp by connecting a starting point Ps and a destination Pd, as described above with reference to FIG. 3.

In subsequent step S3, the movement environment complexity degree recognition section 22 recognizes a degree of complexity of a movement environment from the starting point Ps up to the destination Pd. In next step S4, the total movement route determination section 25 advances the processing to step S30 when the degree of complexity of the movement environment exceeds an upper-limit level, and advances the processing to step S5 when the degree of complexity of the movement environment is the upper-limit level or lower.

Steps S5 to S9 and S20 to S25 are processing of determining the movement route Rt from the starting point PS up to the destination PD shown in FIG. 1 by converting the initial route line into a Bezier curve. On the other hand, step S30 is processing of determining the movement route Rt from the starting point PS up to the destination PD when the movement environment is complicated, by dividing the initial route line from the starting point Ps up to the destination Pd on the map into a plurality of sub-initial route lines and converting each sub-initial route line into a Bezier curve.

In step S5, the movement route determination section 24 sets N (the initial value is one) control points at arbitrary positions within a specific range. In next step S6, the movement route determination section 24 generates a candidate route line by converting the initial route line 110 into a Bezier curve based on the N control points. In subsequent step S7, the movement route determination section 24 determines whether or not all of the split points of the candidate route line are positioned within a passable area.

When all of the split points of the candidate route line are positioned within the passable area, the movement route determination section 24 advances the processing to step S8. In step S8, the movement route determination section 24 performs optimization to minimize the length of the candidate route line, while maintaining a state in which all of the split points are positioned within the passable area. In subsequent step S9, the movement route determination section 24 determines a route in the real space corresponding to the candidate route line as the movement route Rt for the delivery robot 1, and terminates the processing in step S10.

When at least one split point of the candidate route line is positioned within an impassable area, the movement route determination section 24 advances the processing from step S7 to step S20. In step S20, the movement route determination section 24 increments the variable CT, and in subsequent step S21, advances the processing to step S5 when the variable CT does not exceed CT_max. Thus, the processing in steps S5 to S7 is performed again based on the same number of control points.

In step S22, the movement route determination section 24 sets the variable CT to the initial value of one, and in subsequent step S23, increments the variable N. Note that the variable N may be increased by another number than one, for example, by two. In next step S24, when the variable N does not exceed N_max, the movement route determination section 24 advances the processing to step S5. Thus, the processing in steps S5 to S7 is performed again with increased control points.

When the variable N exceeds N_max, the movement route determination section 24 advances the processing from step S24 to step S25. In step S25, the movement route determination section 24 transmits, to the delivery management server 310, movement route determination NG information indicating that the movement route cannot be set, and advances the processing to step S10. The delivery management server 310 having received the movement route determination NG information determines the movement route Rt for the delivery robot 1, for example, by instructing a person in charge of delivery management to manually set the route, or the like, and transmits information on the determined movement route Rt to the delivery robot 1. Thus, delivery by the delivery robot 1 is supported.

Figure 8:
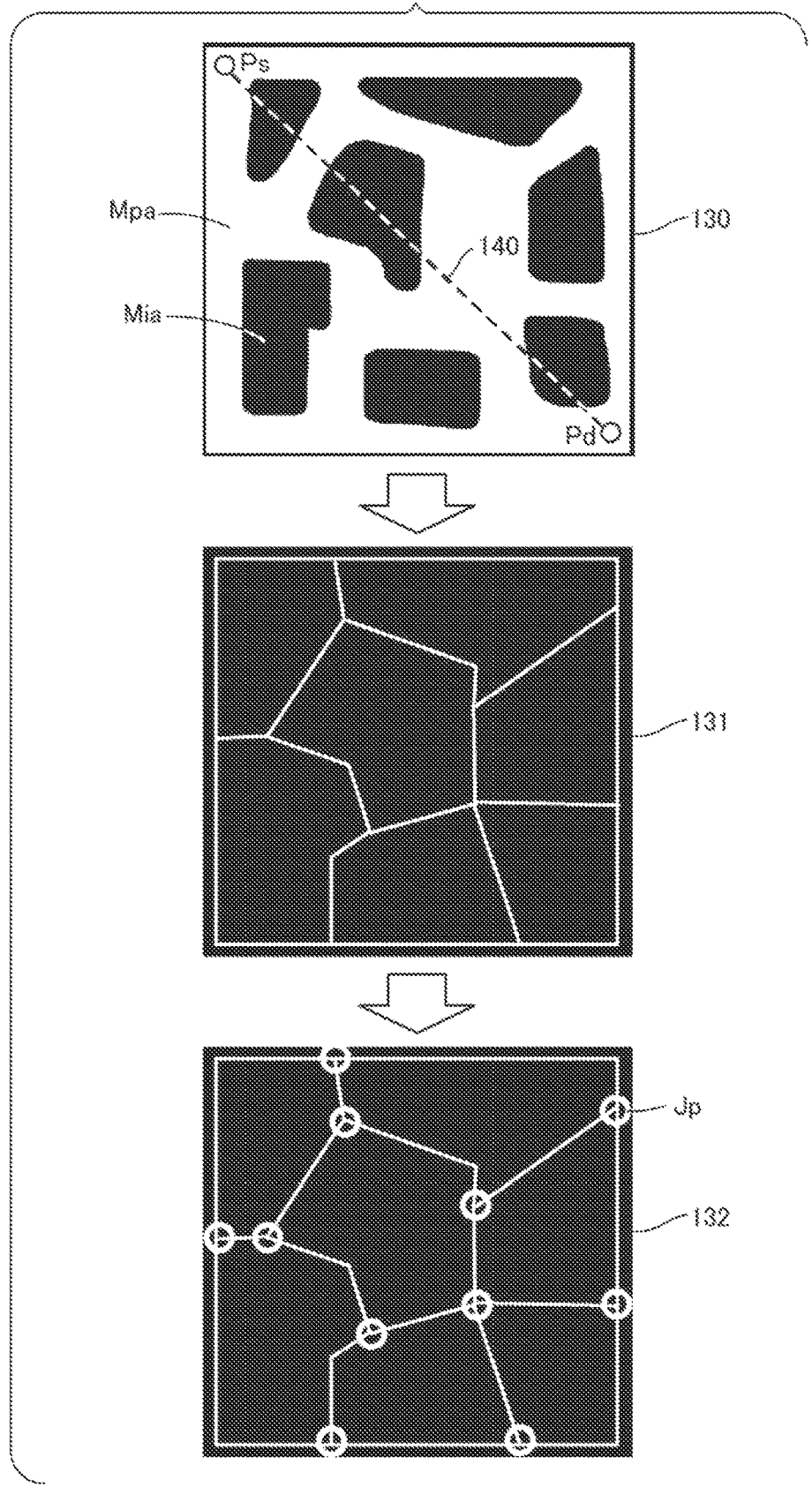
FIG. 8 is an explanatory diagram of processing of extracting a branch point on a route by processing of thinning a passable area.

Next, the processing by the total movement route determination section 25 in step S30 is described with reference to FIGS. 8 to 10. First, FIG. 8 is an explanatory diagram of processing of extracting a branch point of a passable area on a map 130 including a starting point Ps and a destination Pd, in order to set a division point at which an initial route line 140 connecting the starting point Ps and the destination Pd is divided. The total movement route determination section 25 generates a thinned map 131 by performing thinning processing on the passable area Mpa on the map 130. Next, the total movement route determination section 25 extracts the branch point Jp on the thinned map 131, as shown in 132. In 132, a plurality of branch points Jp are extracted.

Figure 9:
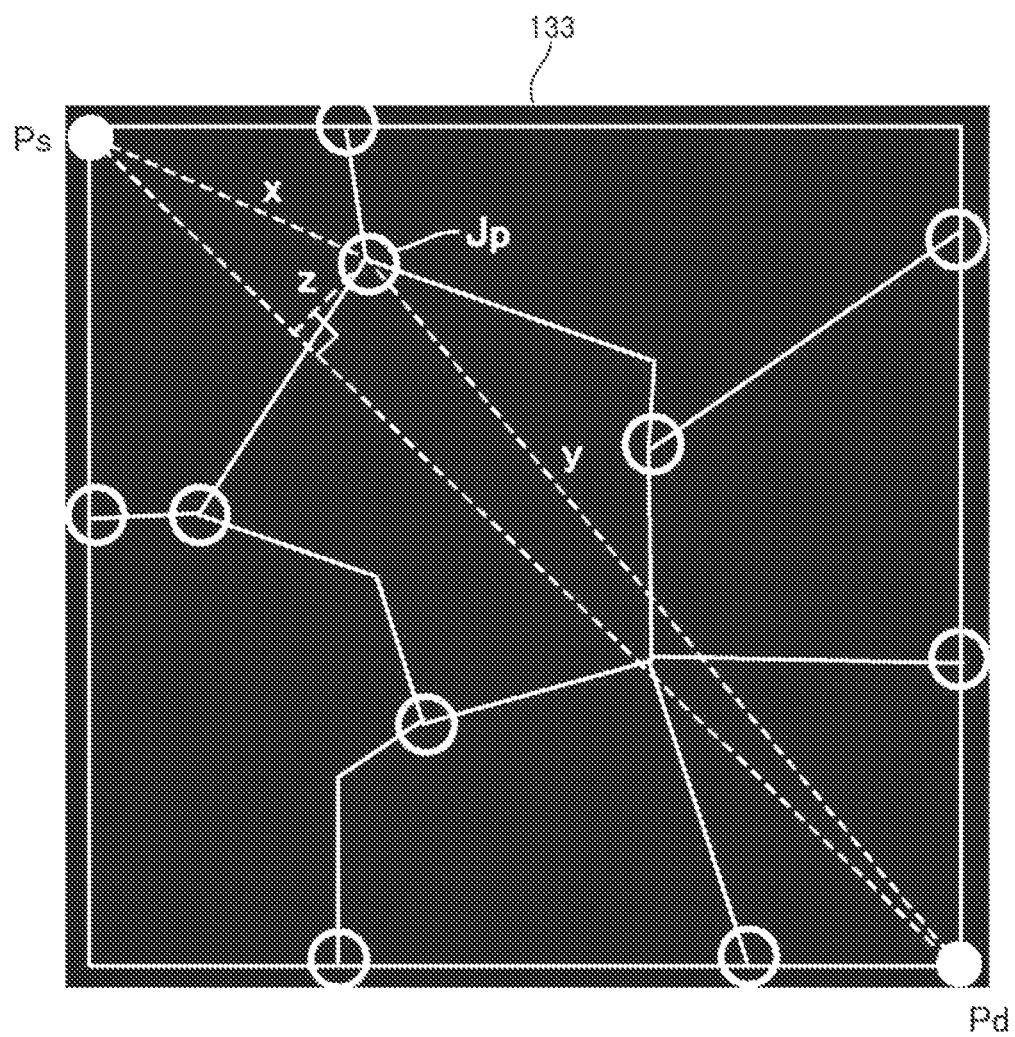
FIG. 9 is an explanatory diagram of processing of selecting, from among a plurality of branch points, a division point at which an initial route line is divided into a plurality of sub-initial route lines.

Subsequently, with respect to each branch point Jp, the total movement route determination section 25 calculates a reference value Rf based on a following expression (1), as shown in FIG. 9.

$$Rf = |x-y| + z \qquad (1)$$

where Rf is the reference value, x is the length from the starting point Ps up to the branch point Jp, y is the length from the destination Pd up to the branch point Jp, and z is the length of a perpendicular line drawn from the branch point Jp to a line segment connecting the starting point Ps and the destination Pd.

The total movement route determination section 25 then determines a branch point with the smallest reference value Rf as the division point to divide the initial route line into a plurality of sub-initial route lines.

In the expression (1), |x−y| becomes smaller as the branch point Jp is closer to a middle point between the starting point Ps and the destination Pd. Moreover, z becomes smaller as the branch point Jp is closer to the line segment connecting the starting point Ps and the destination Pd. Accordingly, the closer the position of a branch point Jp is to the middle point of the line segment connecting the starting point Ps and the destination Pd, the smaller the reference value Rf is, and by selecting a branch point Jp with the smallest reference value Rf, the branch point Jp that is the closest to the middle point between the starting point Ps and the destination Pd can be set as the division point M.

Figure 10:
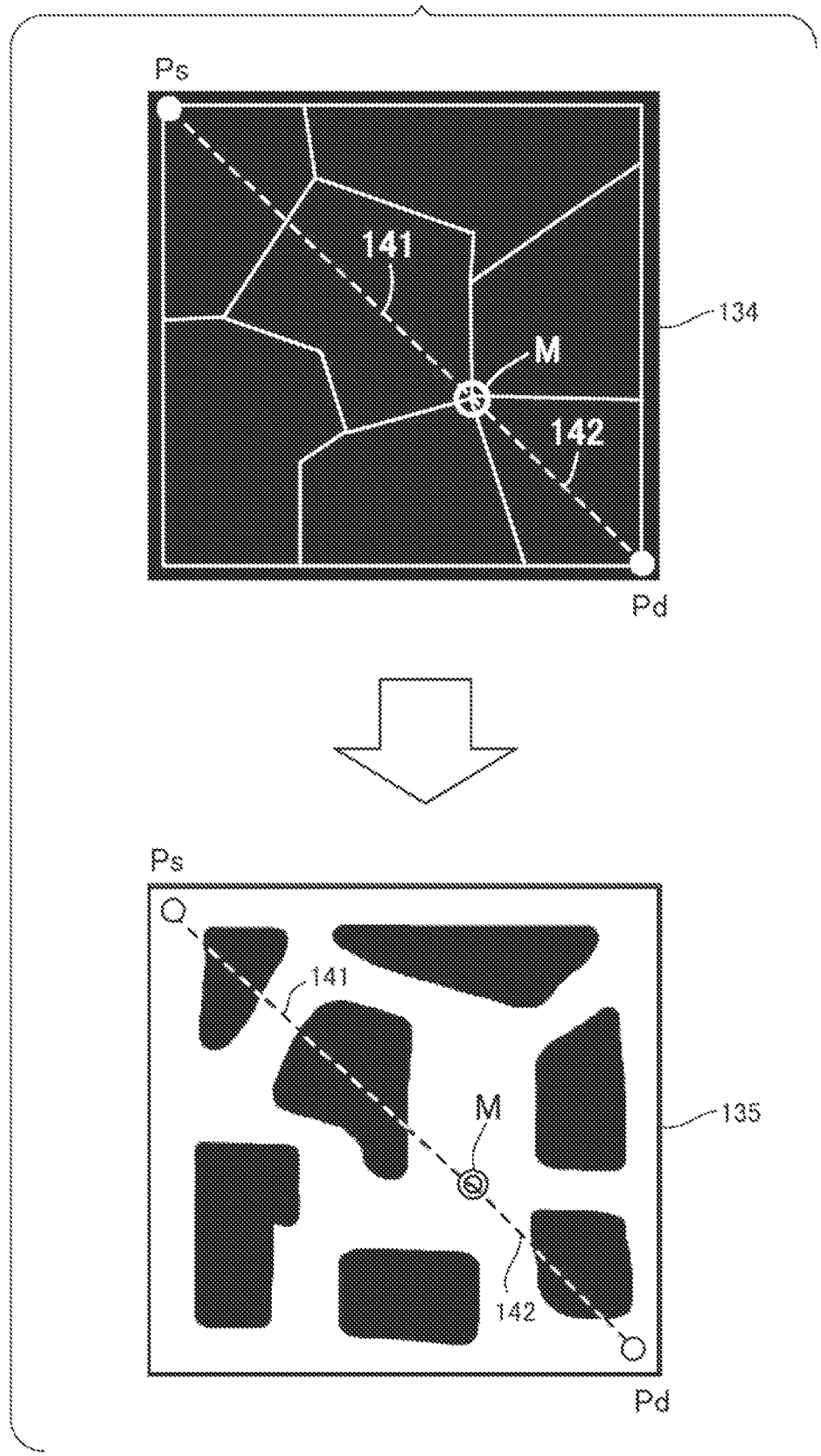
FIG. 10 is an explanatory diagram of processing of determining a sub-movement route with respect to each sub-initial route line.

As shown in FIG. 10, the total movement route determination section 25 divides the initial route line at the division point M into two sub-initial route lines 141, 142 on a thinned map 134. The sub-initial route line 141 is a line segment, one of ends of which is the starting point Ps, and the other end of which is the division point M. One of ends of the sub-initial route line 142 is the division point M, and the other end is the destination Pd.

For each of the sub-initial route line 141 and the sub-initial route line 142, the total movement route determination section 25 performs the setting of split points performed by the initial route line setting section 23 and the processing in steps S5 to S9 and S20 to S24 in FIG. 7. Thus, the total movement route determination section 25 determines a sub-movement route that is a movement route in the real space corresponding to the sub-initial route line 141, and a sub-movement route that is a movement route in the real space corresponding to the sub-initial route line 142.

Then, the total movement route determination section 25 determines the movement route Rt starting from the starting point PS and reaching the destination PD in FIG. 1, by joining the two thus determined sub-movement routes, in the order of the sub-initial route line 141 and the sub-initial route line 142, at a position in the real space corresponding to the division point M on the map.

Note that although FIGS. 8 to 10 show an example in which the initial route line 140 is divided into the two sub-initial route lines 141, 142, the initial route line 140 may be divided into three or more sub-initial route lines.

4. Other Embodiments

In the above-described embodiment, the movement environment complexity degree recognition section 22 is provided, and the initial route line setting section 23 sets the number of split points of the initial route line, according to the degree of complexity of the movement environment. However, the number of split points of the initial route line may be a fixed value.

In the above-described embodiment, the total movement route determination section 25 is provided, and the processing is performed in which the initial route line is divided into the sub-initial route lines, depending on the degree of complexity of the movement environment, and the movement route is determined. However, a configuration may be made such that the total movement route determination section 25 is omitted, and the processing of dividing the initial route line into the sub-initial route lines is not performed.

In the above-described embodiment, the movement route determination section 24 performs the optimization processing of minimizing the length of the candidate route line with all split points positioned within the passable area, through the processing in steps S7 to S8 in FIG. 7. However, a configuration may be made such that the optimization processing is omitted.

Alternatively, an objective function for optimization may be set for the initial route line such that all of the split points are positioned within the passable area and the length is minimized, and the initial route line may be converted into a Bezier curve through calculation processing based on the objective function.

In the above-described embodiment, the delivery robot 1 that travels on a surface of the ground is illustrated as the mobile object of the present invention. However, the present invention can be applied to other types of mobile object such as a ship or an air vehicle if the mobile object moves in a movement environment including a passable area and an impassable area.

In the above-described embodiment, the route determination system is configured as part of the functionality included in the delivery robot 1. As another embodiment, a configuration may be made such that one or some, or all, of the components of the route determination system are included in an external system, such as the delivery management server 310 or the management system 201 of the delivery center 200, other than the mobile object. In such a case, for example, the configuration is such that information on a movement route determined by the external system is transmitted from the external system to the mobile object, whereby the mobile object is enabled to move along the movement route.

In the above-described embodiment, the movement route determination section 24 performs the processing of generating a Bezier curve, as curving processing for the initial route line based on a control point. As another embodiment, curving processing that generates a curve, such as a spline curve, other than a Bezier curve may be performed.

Figure 2:
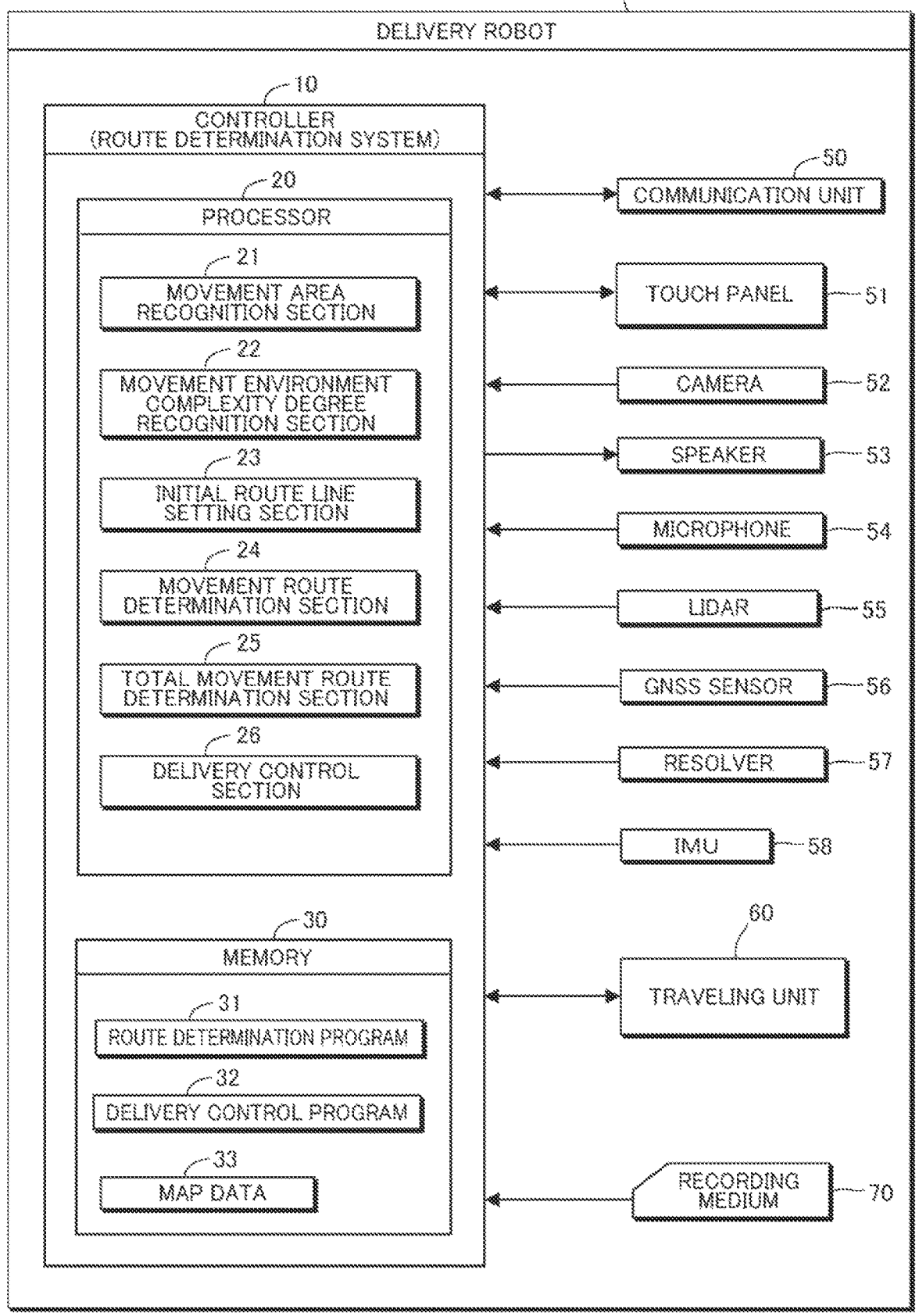
FIG. 2 is a configuration diagram of the delivery robot.

Note that FIG. 2 is a schematic diagram in which components of the delivery robot 1 are categorized and shown based on main processes, to facilitate understanding of the invention of the present application, and components of the delivery robot 1 may be configured based on other categories. Moreover, the process by each component may be executed by a single hardware unit, or may be executed by a plurality of hardware units. The process by each component shown in FIG. 7 may be executed based on a single program, or may be executed based on a plurality of programs.

5. Configurations Supported by the Embodiments

The above-described embodiments are specific examples of the following configurations.

(Configuration 1) A route determination system including: a movement area recognition section that recognizes a passable area and an impassable area on a map of a predetermined area including a starting point where a mobile object starts moving and a destination where the mobile object finishes moving, the passable area being an area in which the mobile object is allowed to move, the impassable area being an area in which the mobile object is not allowed to move; an initial route line setting section that sets an initial route line including a plurality of split points by connecting the starting point and the destination on the map; and a movement route determination section that generates a candidate route line starting from the starting point and reaching the destination by setting a predetermined number of control points at arbitrary positions within a specific range on the map and performing curving processing of curving the initial route line based on the control points, and that when all of the split points of the candidate route line are positioned within the passable area, determines, as a movement route for the mobile object, a route in a real space corresponding to the candidate route line, and when at least one of the split points of the candidate route line is positioned within the impassable area, increases the number of the control points and performs the curving processing again.

According to the route determination system of the configuration 1, the curving processing is performed by the movement route determination section, with the number of the control points sequentially increased, until the candidate route line with all of the split points positioned within the passable area is obtained. Thus, execution of the complicated curving processing based on more control points than necessary is restrained, so that time required to determine a route for the mobile object can be reduced.

(Configuration 2) The route determination system according to the configuration 1, wherein the movement route determination section increases the number of the control points and performs the curving processing again when the candidate route line with all of the split points positioned within the passable area is not obtained even if the predetermined number of the control points are set at arbitrary positions within the specific range and then the curving processing is performed a predetermined number of times.

According to the route determination system of the configuration 2, the processing based on the same number of the control points is repeated to some extent, whereby the probability can be increased that the candidate route line with all of the split points positioned within the passable area can be obtained through the curving processing based on a small number of the control points.

(Configuration 3) The route determination system according to the configuration 1 or 2, wherein the movement route determination section sets the specific range to a range including the starting point and the destination.

According to the route determination system of the configuration 3, a range in which the control points are set is limited within the specific range including the starting point and the destination, whereby the candidate route line with all of the split points positioned within the passable area can be efficiently generated.

(Configuration 4) The route determination system according to the configuration 3, wherein the movement route determination section enlarges the specific range when the candidate route line with all of the split points positioned within the passable area is not obtained even if the curving processing is performed after the number of the control points set at arbitrary positions within the specific range is increased to a predetermined upper-limit number.

According to the route determination system of the configuration 4, the control points are set in a wider range by enlarging the specific range, whereby the probability can be increased that the candidate route line with all of the split points positioned within the passable area is generated.

(Configuration 5) The route determination system according any one of the configurations 1 to 4, wherein the initial route line setting section changes the number of the split points of the initial route line, according to a degree of complexity of a movement environment from the starting point up to the destination.

According to the route determination system of the configuration 5, the number of the split points of the initial route line is changed according to the degree of complexity of the movement environment from the starting point up to the destination, whereby part of the determined movement route can be restrained from running across the impassable area.

(Configuration 6) The route determination system according to any one of the configurations 1 to 5, further including a total movement route determination section that: divides the initial route line into a plurality of sub-initial route lines, each having ends positioned within the passable area; determines a plurality of sub-movement routes corresponding to the plurality of sub-initial route lines, respectively, by, with respect to each of the plurality of sub-initial route lines, assuming that one of the ends of the sub-initial route line is the starting point and the other end of the sub-initial route line is the destination, and performing processing performed by the initial route line setting section and the movement route determination section; and determines a total movement route from the starting point up to the destination in the real space by joining the plurality of sub-movement routes in order of the plurality of sub-initial route lines.

According to the route determination system of the configuration 6, in a case where the distance between the starting point and the destination is long, where the movement environment between the starting point and the destination is complicated, or the like, the initial route line is divided into the plurality of sub-initial route lines, and the sub-movement routes are determined, whereby the total movement route from the starting point up to the destination can be efficiently determined.

(Configuration 7) A mobile object including the route determination system according to any one of the configurations 1 to 6.

According to the mobile object of the configuration 7, execution of the complicated curving processing based on more control points than necessary is restrained, so that time required to determine a route in the passable area can be reduced, and movement within the passable area, from the starting point up to the destination, can be achieved.

(Configuration 8) A non-transitory recording medium on which a route determination program is recorded, the route determination program causes a computer to function as: a movement area recognition section that recognizes a passable area and an impassable area on a map of a predetermined area including a starting point where a mobile object starts moving and a destination where the mobile object finishes moving, the passable area being an area in which the mobile object is allowed to move, the impassable area being an area in which the mobile object is not allowed to move; an initial route line setting section that sets an initial route line including a plurality of split points by connecting the starting point and the destination on the map; and a movement route determination section that generates a candidate route line starting from the starting point and reaching the destination by setting a predetermined number of control points at arbitrary positions within a specific range on the map and performing curving processing of curving the initial route line based on the control points, and that when all of the split points of the candidate route line are positioned within the passable area, determines, as a movement route for the mobile object, a route in a real space corresponding to the candidate route line, and when at least one of the split points of the candidate route line is positioned within the impassable area, increases the number of the control points and performs the curving processing again.

The route determination program of the configuration 8 is executed by a computer, whereby the components of the route determination system of the configuration 1 can be implemented.

REFERENCE SIGNS LIST 1 delivery robot (mobile object), 10 controller (route determination system), 20 processor, 21 movement area recognition section, 22 movement environment complexity degree recognition section, 23 initial route line setting section, 24 movement route determination section, 25 total movement route determination section, 26 delivery control section, 30 memory, 31 route determination program, 32 delivery control program, 33 map data, 60 traveling unit, 310 delivery management server, 100 map, 110 initial route line, 111, 112 Bezier curve, PS starting point (in real space), PD destination (in real space), Rt movement route, Ps starting point (on map), Pd destination (on map), Sp split point, Mpa passable area, Mia impassable area, Cp11, Cp21 to Cp24 control point

What is claimed is:

1. A route determination system comprising a processor and a memory, wherein the processor executes a program recorded in the memory to:
    read map data of a predetermined area including a starting point where a mobile object starts moving and a destination where the mobile object finishes moving, from the memory, and by referring to the map data, generate a map in which a passable area being an area in which the mobile object is allowed to move and an impassable area being an area in which the mobile object is not allowed to move are distinctively indicated;
    set, on the map, an initial route line that is a straight line connecting the starting point and the destination, that is capable to be set by including the passable area and the impassable area, and that includes a plurality of split points provided at equal intervals between the starting point and the destination on the straight line connecting the starting point and the destination;

generate a candidate route line that is a curve starting from the starting point and reaching the destination and that includes the plurality of split points on the curve after a curving processing is performed on the initial route line by setting a predetermined number of control points at arbitrary positions within a specific range on the map and performing the curving processing of curving the initial route line based on the control points;

when all of the split points of the candidate route line are positioned within the passable area, determine, as a movement route for the mobile object, a route in a real space corresponding to the candidate route line, and when at least one of the split points of the candidate route line is positioned within the impassable area, increase the number of the control points and perform the curving processing again; and execute control to autonomously travel the mobile object from the starting point to the destination along the movement route determined.

2. The route determination system according to claim 1, wherein the processor increases the number of the control points and performs the curving processing again when the candidate route line with all of the split points positioned within the passable area is not obtained even if the predetermined number of the control points are set at arbitrary positions within the specific range and then the curving processing is performed a predetermined number of times.

3. The route determination system according to claim 1, wherein the processor sets the specific range to a range including the starting point and the destination.

4. The route determination system according to claim 3, wherein the processor enlarges the specific range when the candidate route line with all of the split points positioned within the passable area is not obtained even if the curving processing is performed after the number of the control points set at arbitrary positions within the specific range is increased to a predetermined upper-limit number.

5. The route determination system according to claim 1, wherein the processor changes the number of the split points of the initial route line, according to a degree of complexity of a movement environment from the starting point up to the destination.

6. The route determination system according to claim 1, wherein the processor:

divides the initial route line into a plurality of sub-initial route lines, each having ends positioned within the passable area;

determines a plurality of sub-movement routes corresponding to the plurality of sub-initial route lines, respectively, by, with respect to each of the plurality of sub-initial route lines, assuming that one of the ends of the sub-initial route line is the starting point and an other end of the sub-initial route line is the destination; and determines a total movement route from the starting point up to the destination in the real space by joining the plurality of sub-movement routes in order of the plurality of sub-initial route lines.

7. A mobile object including the route determination system according to claim 1.

8. A non-transitory recording medium on which a route determination program is recorded, the route determination program causes a computer having a processor to:

read map data of a predetermined area including a starting point where a mobile object starts moving and a destination where the mobile object finishes moving, from a memory, and by referring to the map data, generate a map in which a passable area being an area in which the mobile object is allowed to move and an impassable area being an area in which the mobile object is not allowed to move are distinctively indicated;

set, on the map, an initial route line that is a straight line connecting the starting point and the destination that is capable to be set by including the passable area and the impassable area, and that includes a plurality of split points provided at equal intervals between the starting point and the destination on the straight line connecting the starting point and the destination;

generate a candidate route line that is a curve starting from the starting point and reaching the destination and that includes the plurality of split points on the curve after a curving processing is performed on the initial route line by setting a predetermined number of control points at arbitrary positions within a specific range on the map and performing the curving processing of curving the initial route line based on the control points;

when all of the split points of the candidate route line are positioned within the passable area, determine, as a movement route for the mobile object, a route in a real space corresponding to the candidate route line, and when at least one of the split points of the candidate route line is positioned within the impassable area, increase the number of the control points and perform the curving processing again; and execute control to autonomously travel the mobile object from the starting point to the destination along the movement route determined.

\* \* \* \* \*